Nov. 27, 1956  L. NOTARBARTOLO ET AL  2,771,903
DEVICE FOR THE PROCESSING OF FUSIBLE MATERIALS
Filed Oct. 20, 1952
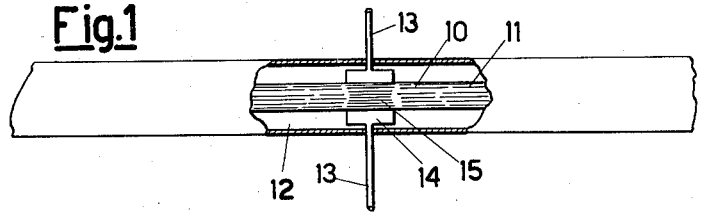
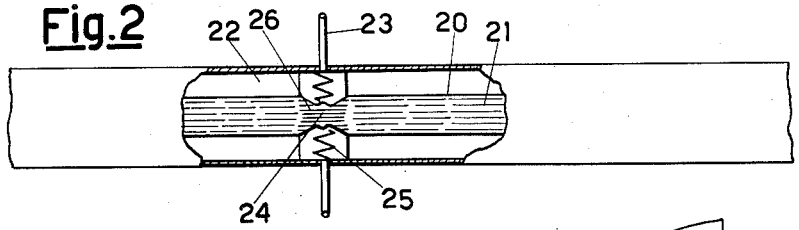
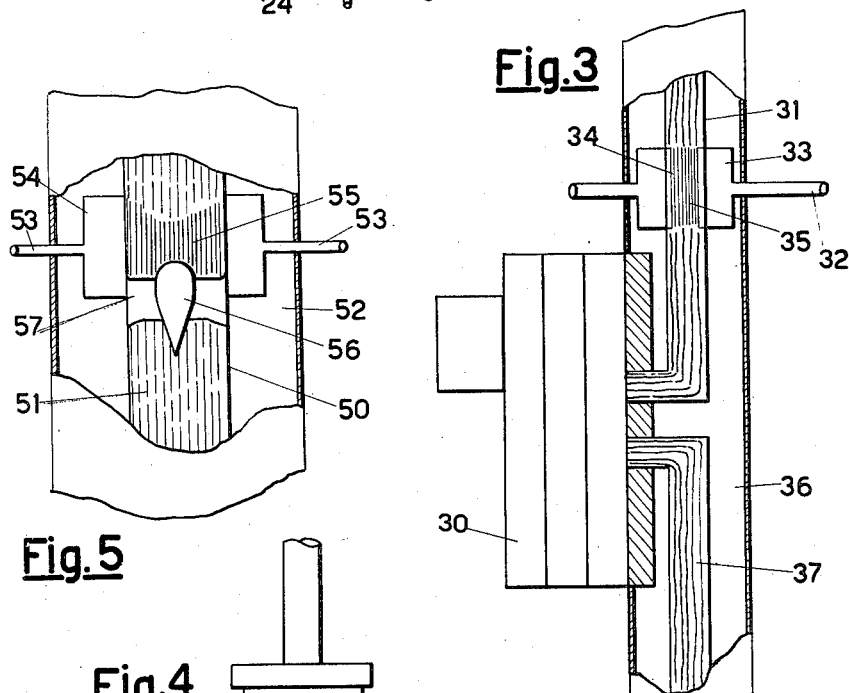
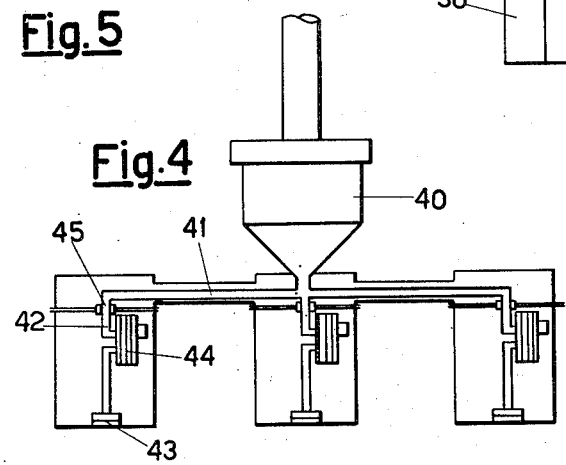
INVENTORS
L. Notarbartolo
W. Muench
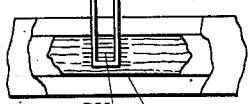
ATTYS.

United States Patent Office 2,771,903
Patented Nov. 27, 1956

2,771,903

DEVICE FOR THE PROCESSING OF FUSIBLE MATERIALS

Luigi Notarbartolo, Milan, and Werner Münch, Cesano Maderno, Italy, assignors to Perfogit Societa per Azioni, Milan, Italy, an Italian company Application October 20, 1952, Serial No. 315,768

Claims priority, application Italy October 31, 1951

1 Claim. (Cl. 137—341)

This invention relates to a method and a device for the processing of fusible materials, in particular melt-spinnable substances, such as f. i. polymers, especially synthetic linear polymers.

It often happens that when such materials are processed in the molten state, they flow through various parts of an apparatus maintained at a sufficiently high temperature to prevent said materials from solidifying. In general, equipment of this type is provided with thermostatizing means, that is, temperature control means that may consist of fluid circulation jackets or other devices. It is often necessary to isolate one part of the equipment from another for a time, f. i. to perform maintenance, cleaning, exchange of parts or other operations. To that end one must stop the flow of the molten substance at a convenient point for the desired time. In these cases, the obvious and universally employed means is that which consists in inserting a stop-cock or a valve at the point where the flow of molten substance is to be discontinued, and in opening or closing said cock or valve. Thus operating, however, one faces many drawbacks when the molten substance is highly viscous and further is at a temperature not too far above its melting point as is often the case, said drawbacks being all the more marked because it is difficult to isolate or heat organs of the character described.

According to the present invention, the flow of molten substance may be discontinued and then resumed, and different parts of an apparatus within which said substance flows may be isolated one from another and then connected again, by an extremely effective and convenient means. In particular, in an apparatus for the melt-spinning of melt-spinnable substances comprising a plurality of units in parallel, anyone of such units may be isolated for maintenance purposes or to change the same, without discontinuing the operation of the other units and therefore that of the apparatus as a whole.

The invention will be better understood with reference to the appended drawings, wherein Fig. 1 represents a fragment of a pipe line of any kind wherein a molten substance flows and the means for discontinuing therein the flow of said substance, according to an embodiment of the invention; Fig. 2 shows another analogous embodiment; Fig. 3 shows a particular form of the invention, as applied to isolating a circulation pump; Fig. 4 shows an application of one form of the invention to a melt-spinning apparatus; and Figs. 5 and 6 show other embodiments of the invention.

In Fig. 1 numeral 10 indicates a pipe wherein the molten substance 11 flows. Pipe 10 is surrounded by a jacket 12 wherein a heating fluid circulates. In correspondence to the zone where it is wished to make it possible to stop the flow of substance 11, there is located a tube 13 through which a current of a cold fluid, f. i. cold air, may be caused to pass, whenever desired, by any convenient means, said tube 13 spreading out to form an annular chamber 14 which surrounds pipe 10 and is in turn surrounded by jacket 12. When for any reason it is desired to discontinue the flow of substance 11, it suffices to blow cold air or cause another cold fluid to pass through tube 13 and chamber 14 to cause the substance 11 to solidify forming a stopper 15.

If this should be desirable, one may even reduce or eliminate the circulation of the heating fluid in jacket 12 in the vicinity of the zone where the stopper 15 is to form. It suffices, in order to re-establish the flow of the molten substance, to discontinue blowing cold air or causing other cold fluid to pass, thus permitting stopper 15 to melt by effect of the heat transmitted from jacket 12 wherein the normal circulation of the heating fluid, if it had been modified or stopped, will have been resumed. If the heat thus transmitted should not be sufficient to melt stopper 15 with the desired speed, auxiliary heating means of any convenient nature may be provided, f. i. in the way indicated in Fig. 2 which illustrates an electric resistance 25 that surrounds the zone of the stopper which is identified in said figure by numeral 24, or a hot liquid or gas may be caused to pass in that same tube 13 shown in Fig. 1.

The example of Fig. 2 is also characterized in that the pipe 20 in which the molten substance 21 flows is internally configurated, in the zone wherein stopper 24 forms, in such a way as to retain the stopper itself and prevent it from being expelled by pressures that may be exerted thereupon. As indicated in said figure, said pipe may present a bottleneck 26, which may be substituted by any other suitable conformation, such as f. i. an inner screw thread, as will be indicated later on (Fig. 3), or by a succession or steps or projections or the like. For the rest, one may repeat all that has been said with respect to Fig. 1, the heating jacket being here designated by numeral 22 and being interrupted in correspondence to the zone where stopper 24 is to be formed, and the cold fluid feed tube being here designated by numeral 23. The annular chamber into which tube 23 opens is defined here by the interruption of jacket 22.

Figure 3 shows in detail the application of the invention to the isolation of a circulation pump 13. The isolating device is located on intake pipe 31 and comprises a tube 32 through which the cold fluid passes and which opens into annular chamber 33. An innerly threaded zone 34 is embodied in pipe 31 in correspondence to chamber 33; stopper 35 forms in said zone. A hot fluid circulation chamber 36 covers both pipe 31 and outlet pipe 37. The operation is analogous to that of the device of Fig. 1.

Fig. 4 shows schematically a melt-spinning apparatus, f. i. for synthetic linear polymers, comprising a melting vessel 40 and a pipe line 31 provided with branches 42 indicated in the number of three and ending each with a spinneret 43 preceded by a spinning pump 44. In this case it is often desirable to stop one pump and one spinneret without interfering with the operation of the others, and this is effected in the best way by providing, in correspondence of each branch, an isolating device generally indicated at 45 and having the structure illustrated in the foregoing or in the following figures or still another structure according to the invention.

Fig. 5 illustrates a further embodiment of the invention particularly adapted for large diameter pipes. In such pipes it may happen that when a solid stopper has been formed and the pipe is heated from the outside, the parts of the stopper adjacent the pipe walls may melt completely while the core of the stopper is still solid. In such a case said core may be carried away by the flow of molten material and progress along the pipe line, thereby causing trouble. To avoid this, in that case, a piece 56 of a convenient material, f. i. a metal, is provided in the interior of the pipe line and is connected to its walls preferably by means of conducting fins 57 or in another suitable way. Thus on one hand the central portion of stopper 55 is reduced, and on the other the heat imparted to the walls is transmitted through fins 57 to piece 56 thereby facilitating the melting of the inner portion of the stopper. It is understood that in any case the piece 56 has the effect of anchoring the stopper and therefore that it may be conveniently used even independently of any consideration concerning the melting of the stopper and for pipes of any diameter.

In the embodiments illustrated hereinbefore, the cooling of the apparatus containing the molten material at the point where the same is to be solidified, is performed from the outside to the inside. However, it may be equally well effected from the inside to the outside, or concurrently in both ways. The means for effecting the cooling from the inside may be of any kind. One particular means is illustrated by way of example in Fig. 6 and consists of a little tube 60 that penetrates into the inside of pipe 62 wherein the molten material flows. When a stream of a cold liquid or gas is caused to flow through tube 60, a solid stopper 61 is formed and the phenomena already described in relation to the previous embodiments occurs. The shape and path of tube 60 may be varied at will and thus it may pass through pipe 62 from one side to the other thereof instead of bending like a U as shown. The same device of Fig. 6 or a like one may be employed to cause the stopper that has formed to melt. Thus, when the stopper has formed because of the flow of a cold fluid through a tube like tube 60, the stopper may be melted by causing a hot liquid or gas to flow through the same tube.

Even when the formation of the stopper has been provoked through other means, f. i. by cooling from the outside, a heating from the inside may be employed to melt the stopper, and such heating from the inside may be effected by causing a hot fluid to pass through a device of the type of that of Fig. 6.

While some preferred embodiments of the invention have been described, it is understood that the same is not limited to said embodiments, and that many modifications, variations and adaptations may be made therein by persons skilled in the art without exceeding the scope of the invention and of this patent.

What we claim is:

In an apparatus for spinning a synthetic linear polymer from the melt, in combination, a conduit for delivering molten polymer in a normally continuous flow from one point to another of said apparatus, a portion of said conduit being provided with projections in the inner wall of said conduit, means for normally maintaining said polymer therein in the molten state, and means for temporarily cooling said portion of said conduit, while the same is entirely filled with the aforementioned polymer, whereby to cause the temporary formation therein of a plug of solidified polymer and to discontinue said normally continuous flow of said molten polymer.

References Cited in the file of this patent

UNITED STATES PATENTS

| | | |
|---|---|---|
| 1,315,766 | Feldman | Sept. 9, 1919 |
| 1,906,636 | Schlecker | May 2, 1933 |
| 2,002,383 | Witt | May 21, 1935 |
| 2,303,338 | Dreyfus et al. | Dec. 1, 1942 |
| 2,320,506 | Bennett et al. | June 1, 1943 |
| 2,687,552 | Gabler | Aug. 31, 1954 |